US006863409B2

(12) United States Patent
Cho et al.

(10) Patent No.: US 6,863,409 B2
(45) Date of Patent: Mar. 8, 2005

(54) APPARATUS FOR GENERATING PARALLEL BEAM WITH HIGH FLUX

(75) Inventors: Sang Jin Cho, Daedeok-ku (KR); Chang Hee Lee, Yusong-ku (KR); Young Jin Kim, Yusong-ku (KR); Jeong Soo Lee, Yusong-ku (KR); Young Hyun Choi, Yusong-ku (KR); Kwang Pyo Hong, Yusong-ku (KR)

(73) Assignees: Korea Atomic Energy Research Institute, Taejon-si (KR); Korea Hydro & Nuclear Power Co., Ltd., Seoul (KR)

( * ) Notice: Subject to any disclaimer, the term of this patent is extended or adjusted under 35 U.S.C. 154(b) by 85 days.

(21) Appl. No.: 10/390,997

(22) Filed: Mar. 18, 2003

(65) Prior Publication Data

US 2004/0136102 A1 Jul. 15, 2004

(30) Foreign Application Priority Data

Jan. 15, 2003 (KR) ................................ 10-2003-0002779

(51) Int. Cl.[7] .................................................. G02B 5/10
(52) U.S. Cl. ....................................................... 359/853
(58) Field of Search ................................ 359/853, 850, 359/856, 857, 858, 859

(56) References Cited

U.S. PATENT DOCUMENTS 5,777,804 A * 7/1998 Nakamura et al. .......... 359/727
6,367,954 B1 * 4/2002 Futami ........................ 362/297

OTHER PUBLICATIONS

An article entitled "Portable Parallel Beam X–Ray Diffraction System", published by US Department of Energy, Nov. 1999.

An article entitled "Parallel Beam X–Ray Diffraction", published by X–Ray Optical Systems Inc., 2002.

An article entitled, "Graded SIG Crystals as X–ray Collimators", By Petrashen et al., published by Nuclear Instruments and Methods in Physics Research A, pp. 467–487, 2001.

An article entitled "Gobel Mirrors for Parallel–beam", published by Crystallography Laboratory University of Nijmegen.

* cited by examiner

*Primary Examiner*—Euncha P. Cherry
(74) *Attorney, Agent, or Firm*—Bachman & LaPointe, P.C.

(57) ABSTRACT

Disclosed herein is an apparatus for generating a parallel beam with a high flux. The apparatus of the present invention includes a light source, a first mirror and a second mirror. The light source is positioned at a first focal point of a first ellipse. The first mirror is positioned on the first ellipse to reflect a beam emitted by the light source, and concavely shaped to conform to a section of the first ellipse. The second mirror is positioned across a path of the beam reflected by the first mirror, and convexly shaped to conform to a section of a second ellipse so that an angle formed by two tangent lines passing through each pair of incident points of neighboring rays incident upon the second mirror, respectively, is half of an angle formed by two tangent lines passing through each pair of incident points of neighboring rays incident upon the first mirror, respectively.

4 Claims, 12 Drawing Sheets

APPARATUS FOR GENERATING PARALLEL BEAM WITH HIGH FLUX

BACKGROUND OF THE INVENTION

1. Field of the Invention

The present invention relates generally to an apparatus for generating a parallel beam with a high flux through the appropriate arrangement of mirrors, and more particularly to an apparatus for generating a parallel beam with a high flux, in which existing optical component parts thereof are effectively arranged, so the flux of an X-ray, a neutron beam or the like is increased and the divergence of the X-ray, the neutron beam or the like is reduced.

2. Description of the Prior Art

Since visible light, an X-ray and a neutron beam allow the artificial selection of wavelengths, they are utilized to analyze structures in the fields of the atomic array of solid materials, a semiconductor, an optical element and biochemistry. As illustrated in FIG. 1, light radially propagates from a light source, so the flux of light is in inverse proportion to the square of a distance between the light source and an observer. This means that the fluxes of light are significantly reduced at the positions of a sample and a detector that are employed to analyze the structure of material. FIG. 2 is a diagram of a simple slit type X-ray reflectometer.

Further, in the cases where slits for line focusing (for instance, in reflectometers for measuring thin films) and point focusing (for instance, in four circle diffraction for measuring single crystals) are used, the fluxes of light are further reduced.

As a result, major laboratories and equipment companies continued to carry out research to increase the flux of a beam and reduce the divergence of a beam. Particularly, in the field of neutron scattering, a cold neutron source and a neutron guide are employed so as to increase the flux of a neutron beam having a certain wavelength.

FIGS. 3*a* to 3*c* are views showing a method of generating a parallel beam using a Goebel mirror (a kind of X-ray mirror) provided by Bruker Co. (Germany). FIG. 3*a* is a view showing the arrangement of the Goebel mirrors, FIG. 3*b* is a view showing the principal of generating a parallel beam using the Goebel mirrors, and FIG. 3*c* is a graph showing reflectance measured using the Goebel mirrors. In the case of using these Goebel mirrors, the flux of light is increased about 20 times that obtained using a simple X-ray analyzing apparatus, so the Goebel mirrors are widely utilized.

These Goebel mirrors have a hyperbolic geometry $$\left(\frac{x^2}{a^2} - \frac{y^2}{b^2} = 1\right).$$

Although the flux of a beam can be increased as the Goebel mirrors approach the center of a hyperbola, the Goebel mirrors cannot approach an X-ray source due to the arrangement of a beam, and it is difficult to generate a completely focused line beam (linear beam<0.1 mm).

Further, in an atomic reactor generating neutrons, it is difficult for neutron mirrors to approach a position near the center of a hyperbola (a neutron source) and the sizes of mirrors must be increased to prevent the divergence of a beam in the case of reflecting the beam using mirrors positioned at a distance, so there is no advantage in terms of increasing the flux of light.

Another method is implemented using a capillary tube as shown in FIGS. 4*a* and 4*f*. This method can be applied to both a neutron beam and an X-ray because a beam dispersing at a wide angle can be focused and a parallel beam can be easily generated, and this method can be used in a limited space because the diameter of the capillary tube can be reduced. However, the intensity of a neutron beam or an X-ray is reduced due to multiple reflection as the neutron beam or the X-ray passes through the capillary tube, and the number of rays is dependent on the thickness of the capillary tube. So, the efficiency of the method is only 10~50%. The minimization of the diameter (about 5~50 micrometers) and thickness of the capillary tube is a principal factor in determining the efficiency of use of a limited space. Meanwhile, X-ray Optical System Inc. developed and is selling such capillary tubes, but these capillary tubes are very expensive.

A third method is implemented by focusing a beam and generating a parallel beam in such a way as to adjust the sizes of lattices by replacing crystal lattices with graded impurities (Si→Ge), which requires complete control during the growing of a crystal. There is a report that indicates the resolution of such a problem (A. Erko, F. Schaerfers, W. Gudat, N. V. Abrosimov, S. N. Rossolenko, V. Alex, W. Schroedoer, Nucl. Instr. Meth. Phys. Res. A374 (1996) 408). However, technical difficulties still remain, and a beam diffracted by a crystal is difficult to use because it has a weak flux compared to a reflected beam.

FIGS. 5*a* to 5*e* show methods of focusing beams and forming parallel beams through the use of graded crystals. FIGS. 5*a* and 5*b* show mirrors simply using graded crystals, which are a wide-angle mirror and a focusing mirror, respectively. FIGS. 5*c* to 5*e* show devices using asymmetric graded crystals, which are a narrow beam conditioner, a symmetric collimator, and an ultimate collimator, respectively. See P. Petrashen A. Erko, Graded SiGe crystals as X-ray collimators, Nuclear Instruments and Method in Physics research A467–468 (2001) 358–361.

When these methods are used, the sizes of gratings are changed through the growth of crystals. Accordingly, it is not necessary to bend crystals using physical force because a crystal itself functions as a focusing bender, and parallel beams can be formed by cutting crystals in desired directions and therefore adjusting incident angles.

SUMMARY OF THE INVENTION

Accordingly, the present invention has been made keeping in mind the above problems occurring in the prior art, and an object of the present invention is to provide an apparatus for generating a parallel beam with a high flux, in which mirrors are arranged in an elliptical manner, thus effectively increasing the flux of an X-ray, a neutron beam or the like and generating a parallel beam by reducing the divergence of the beam.

Another object of the present invention is to provide an apparatus for generating a parallel beam with a high flux, which is capable of generating a parallel point beam using ellipsoidal mirrors.

In order to accomplish the above objects, the present invention provides an apparatus for generating a parallel beam with a high flux, including a light source positioned at a first focal point of a first ellipse; a first mirror positioned on the first ellipse to reflect a beam emitted by the light source, and concavely shaped to conform to a section of the first ellipse; and a second mirror positioned across a path of the beam reflected by the first mirror, and convexly shaped to conform to a section of a second ellipse so that an angle formed by two tangent lines passing through each pair of incident points of neighboring rays incident upon the second mirror, respectively, is half of an angle formed by two tangent lines passing through each pair of incident points of neighboring rays incident upon the first mirror, respectively.

Preferably, the first mirror may be positioned at an end of a short axis of the first ellipse, or positioned between an end of a long axis of the first ellipse and an end of a short axis of the first ellipse in the vicinity of a second focal point of the first ellipse.

Preferably, the elliptical parameters a' (a half of a distance of the long axis), b' (a half of a distance of the short axis) and e' (a distance between a center and a focal point) of the second ellipse are obtained by the following equations $$a' \approx \frac{S}{P} \times 2 \times a$$

$$b' \approx \frac{S}{P} \times 2 \times b$$

$$e' \approx \sqrt{a'^2 + b'^2}$$

where a and b are elliptical parameters of the first ellipse, P is a maximum distance between the incident points of the first mirror, and a maximum distance between the incident points of the second mirror.

In addition, the present invention provides an apparatus for generating a parallel beam with a high flux, including two ellipsoidal mirrors to form a parallel point beam, instead of four elliptical mirrors.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

The fundamental principle of the present invention is to arrange mirrors in an elliptical manner. The basic embodiment of the present invention is composed of two elliptical mirrors.

Figure 1:
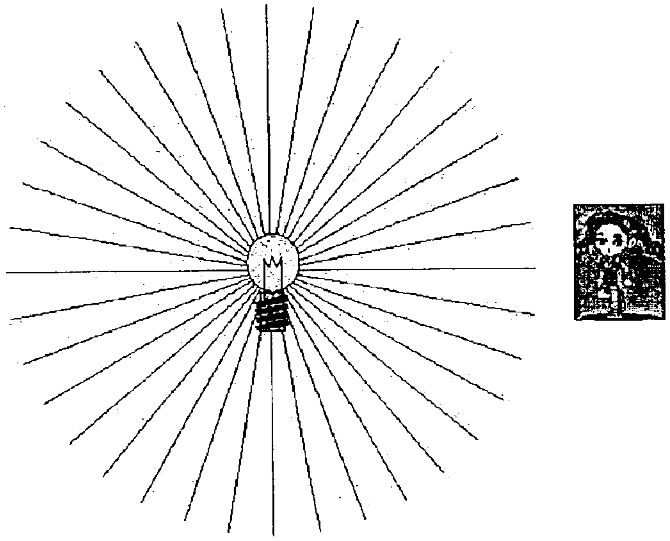
FIG. 1 is a diagram showing a principle of light radiation.
Figure 2:
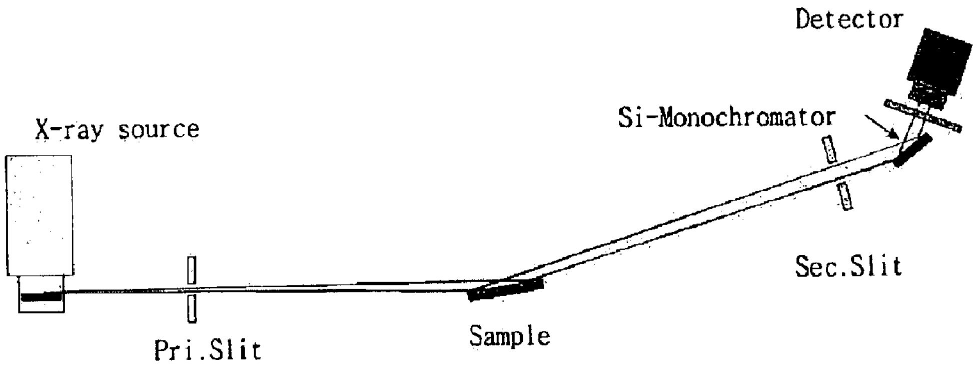
FIG. 2 is a view showing the construction of a simple slit type X-ray reflectometer.
Figure 3A:
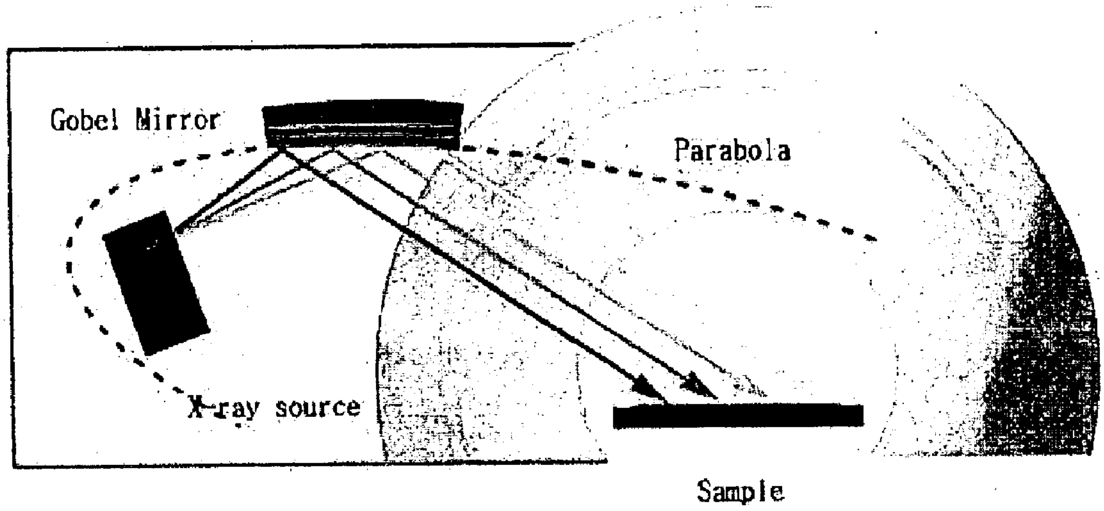
FIGS. 3*a* to 3*c* are views showing a method of generating a parallel beam using Goebel mirrors manufactured by Brucker Co.
Figure 3B:
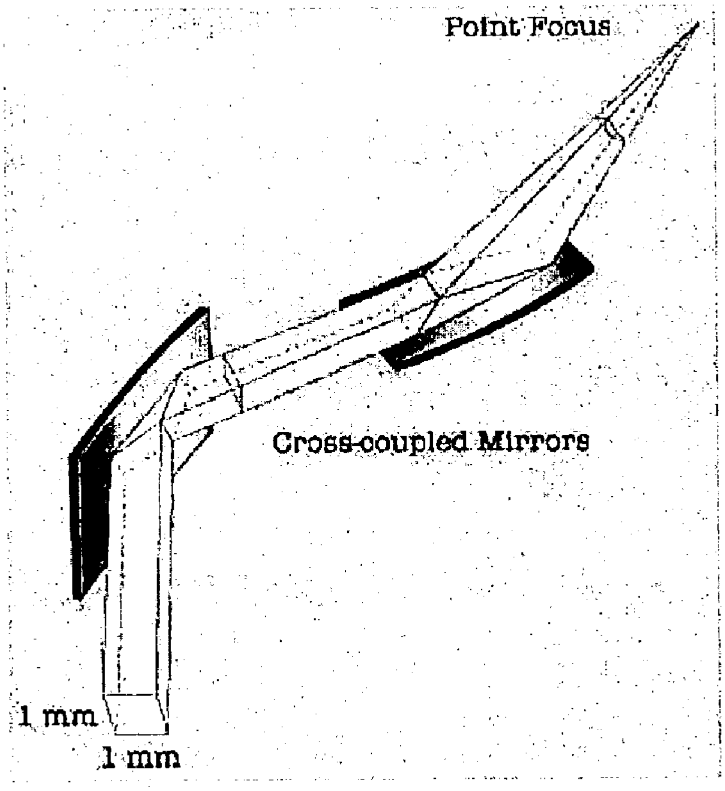
Figure 3C:
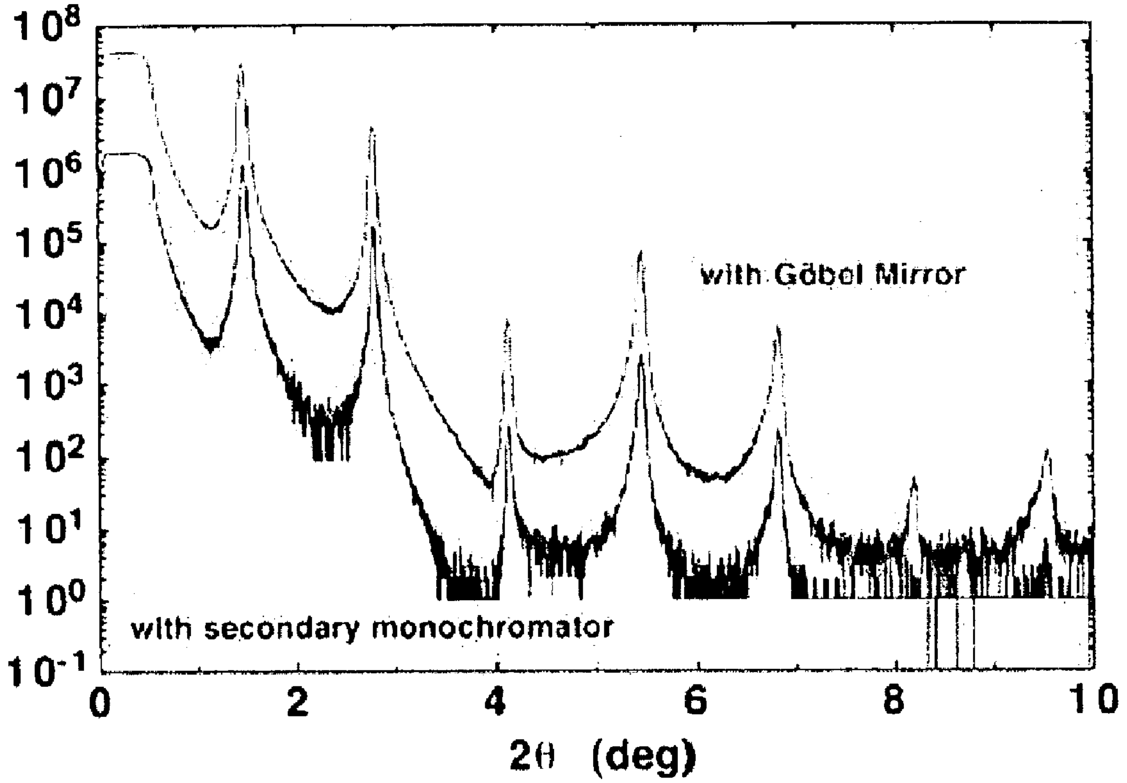
Figure 4A:
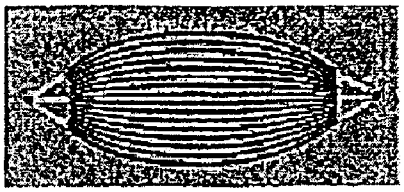
FIGS. 4*a* to 4*f* are views showing a method using capillary tubes manufactured by X-ray optical system Inc.
Figure 4B:
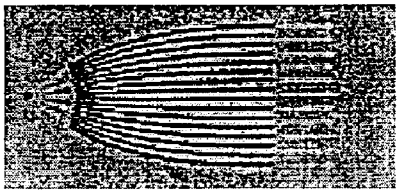
Figure 4C:
Figure 4D:
Figure 4E:
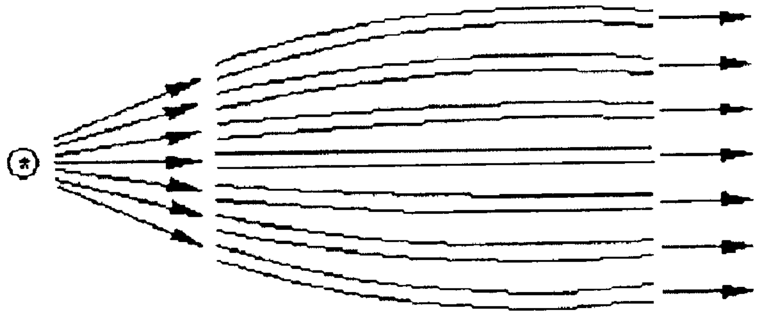
Figure 4F:
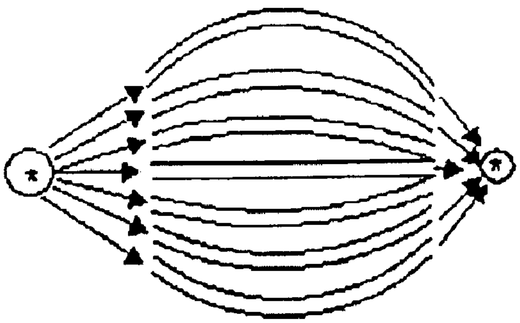
Figure 5A:
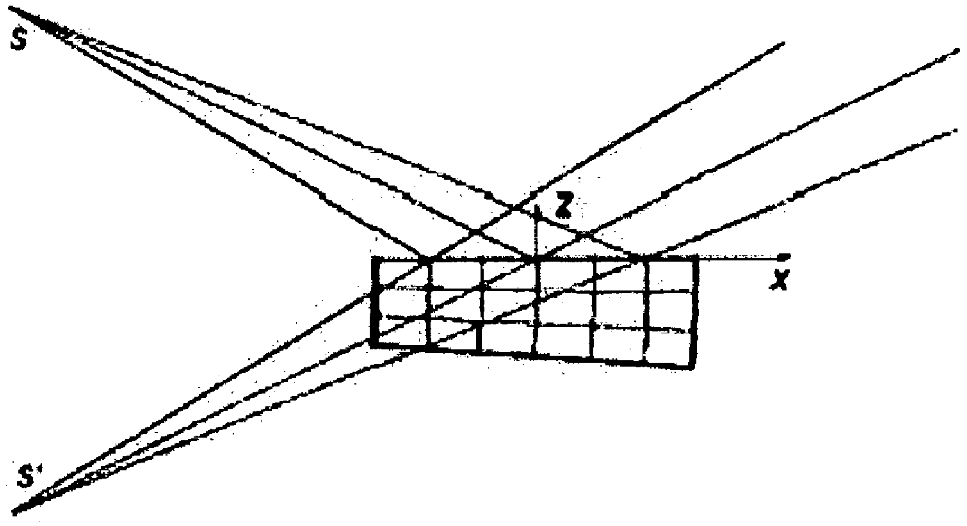
FIGS. 5*a* to 5*e* are diagrams showing methods of focusing a beam and generating a parallel beam using graded SiGe crystals.
Figure 5B:
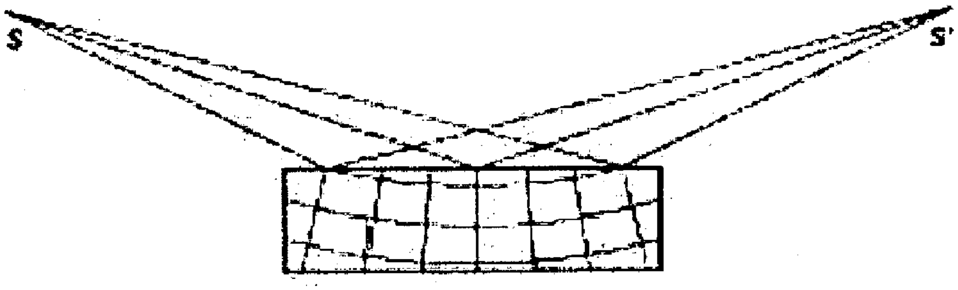
Figure 5C:
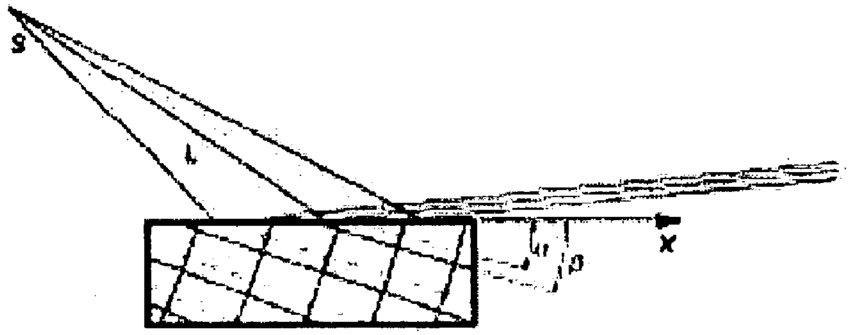
Figure 5D:
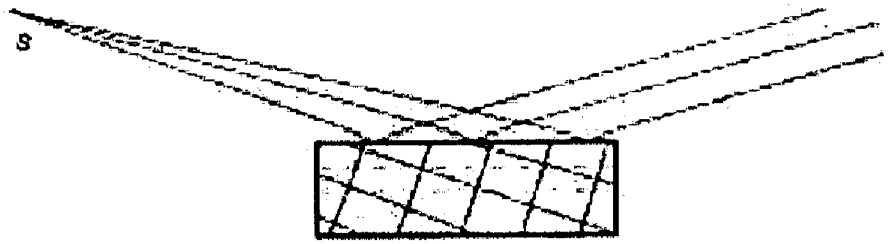
Figure 5E:
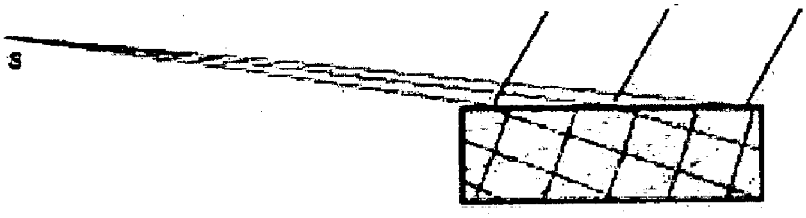
Figure 6:
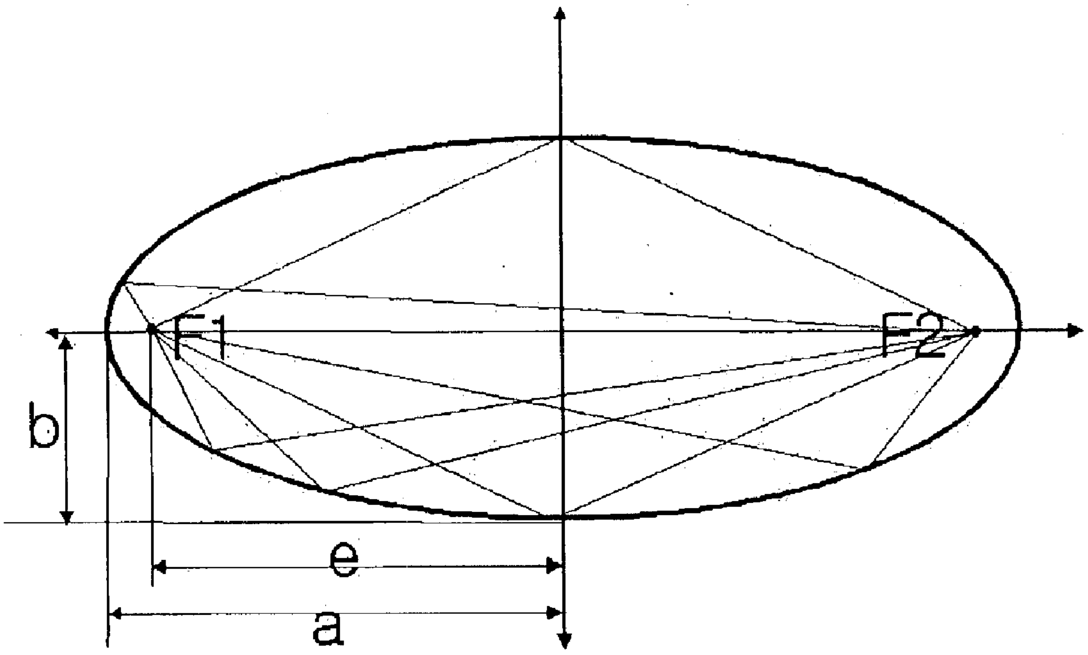
FIG. 6 is a diagram showing the structure of an ellipse.

As illustrated in FIG. 6, inside an elliptical reflective boundary, beams generated at one focal point of the elliptical reflective boundary are reflected by the elliptical reflective boundary and directed toward the other focal point. In this drawing, F1 and F2 designate the two focal points, and it can be seen that beams generated at the focal point F1 are reflected by the inside reflective surface of the elliptical reflective boundary and directed toward the other focal point F2. Reference characters a, b and e are elliptical parameters, and represent a half of the length of a long axis, a half of the length of a short axis and a distance between the center of the elliptical reflective boundary and one focal point, respectively.

Figure 7:
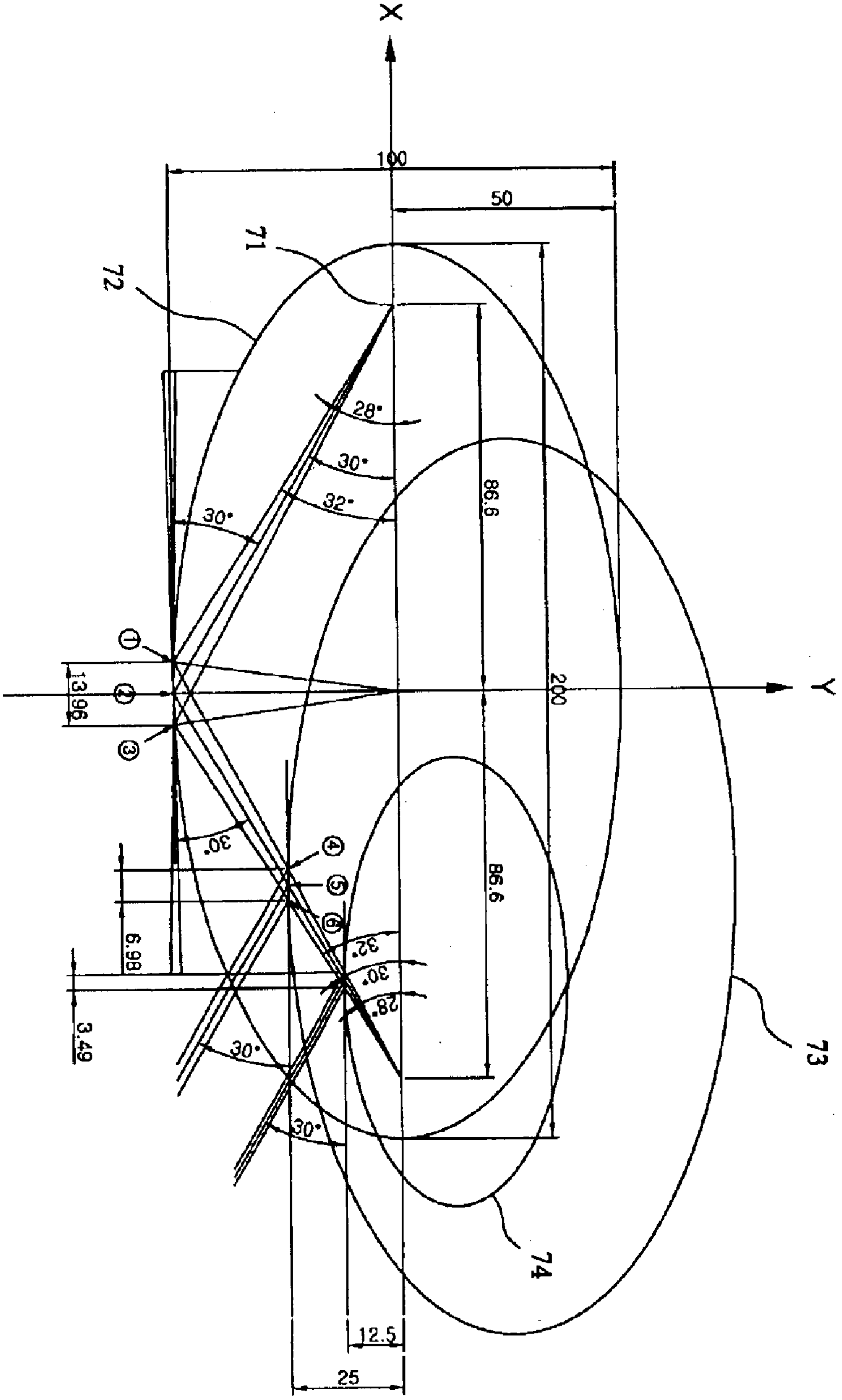
FIG. 7 is a diagram showing a principle of generating a parallel beam in accordance with the present invention.

FIG. 7 is a diagram schematically showing a principle of generating a parallel beam using elliptical mirrors. An apparatus for generating a parallel beam is comprised of a light source and two mirrors. The light source is positioned at one focal point 71 of a first ellipse, in an example shown in FIG. 7, a left focal point. A first mirror is positioned across points of the first ellipse 72, in this embodiment, along the points ①, ② and ③ of the first ellipse 72. A second mirror is positioned along the points ④, ⑤ and ⑥ of a second ellipse 73.

Assuming that elliptical parameters a, b and e of the first ellipse 72 are 100 mm, 50 mm and 86.6 mm, respectively, rays emitted from the left focal point of the first ellipse 72 to the points ①, ② and ③ form incident angles of 32°, 30° and 28° with a reference line (x-axis) extending from the left focal point to the right focal point, respectively.

The first mirror is positioned on the incident positions of the first ellipse 72 as described above, and is a concave mirror shaped to conform to the first ellipse 72. Rays, reflected at the points ①, ② and ③ of the first ellipse 72, that is, the points ①, ② and ③ positioned on the first mirror, and directed toward a right focal point of the first ellipse 72, form angles of 28°, 30° and 32° with an X axis. The reason for this is that lines tangent to the first ellipse 72 at the points ① and ③ each form an angle of 2° with a line tangent to the first ellipse 72 at the point ②. Further, this means that lines tangent to the first ellipse 72 at the points ①, ② and ③ always form an angle of 30° with incident rays emitted from the left focal point.

In order to generate a parallel beam, another mirror (a second mirror) should be positioned across paths of rays extending to the right focal point of the first ellipse 72. The second mirror is positioned on a second ellipse 73, and is a convex mirror shaped to conform to the second ellipse 73. Accordingly, in the first reflection, rays are reflected by a concave section of the first ellipse 72, while in the second reflection, rays are reflected by a convex section of the second ellipse 73. FIG. 7 shows that the second mirror can be positioned at a different position on an ellipse 74 with a different shape.

Elliptical parameters a', b' and c' of the second mirror used to generate a parallel beam can be obtained by the following Equation 1.

$$a' \approx \frac{S}{P} \times 2 \times a \tag{1}$$

$$b' \approx \frac{S}{P} \times 2 \times b$$

$$e' \approx \sqrt{a'^2 + b'^2}$$

where P is the distance between ① and ③ of the first ellipse 72 and S is the distance between ④ and ⑥ of the second ellipse 73.

When the long and short axes of an ellipse are multiplied by 2 as in the above Equation 1, lines tangent to the second ellipse 73 at the points ④ and ⑥ each form an angle of ≈1° with a line tangent to the first ellipse 72 at the point ⑤ (errors are ignored), so rays reflected at the points ④ and ⑥ are parallel with a ray reflected at the point ⑤.

Figure 8:
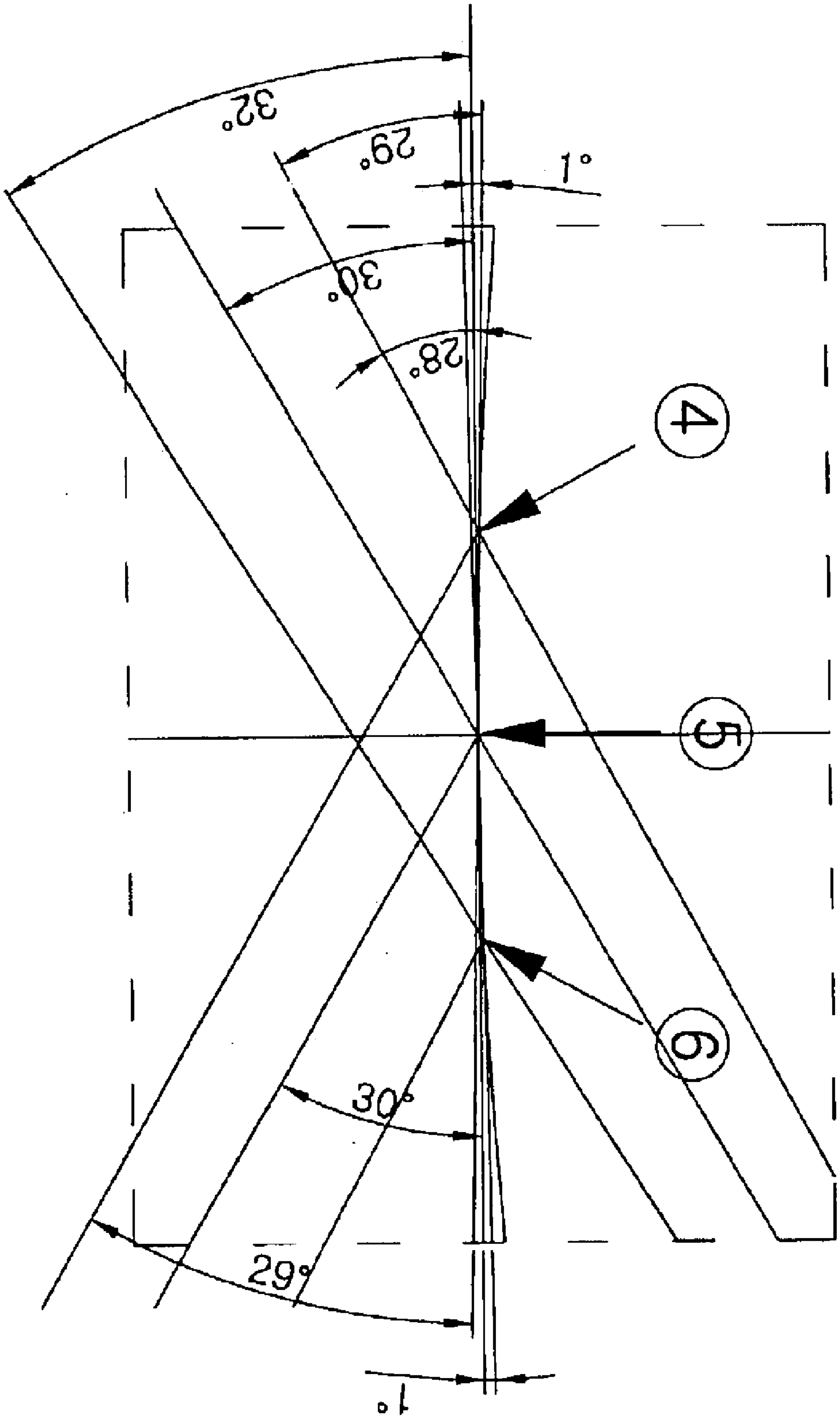
FIG. 8 is an enlarged view of a second mirror of FIG. 7.

That is, the shapes of ellipses are determined so that an angle formed by two tangent lines passing through each of two pairs of neighboring points ① and ②, and ② and ③ of the first ellipse 72, respectively, doubles an angle formed by two tangent lines passing through each of two pairs of neighboring points ④ and ⑤, and ⑤ and ⑥ of the second ellipse 73. With this method, the width of a parallel line beam can be adjusted, and spatial limitation, that is, a disadvantage of Goebel mirrors, can be overcome. FIG. 8 is an enlarged view of a portion on which the second mirror is positioned, which shows that an angle formed by two tangent lines passing through each of two pairs of neighboring points ④ and ⑤, and ⑤ and ⑥ of the second ellipse 73 is 1°.

Figure 9:
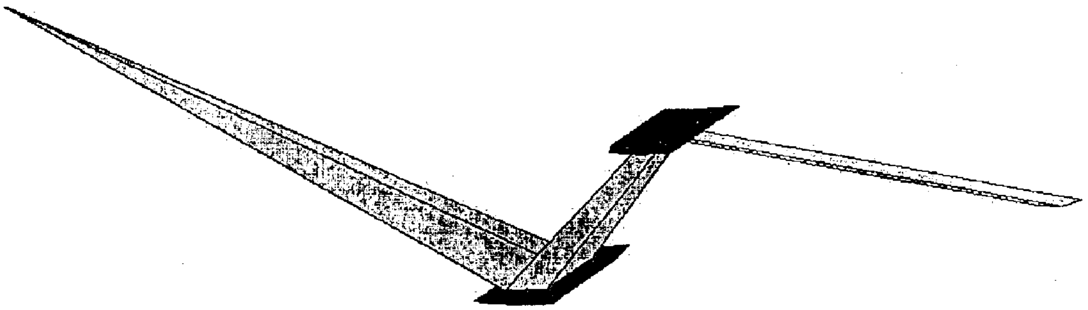
FIG. 9 is a view showing a line focusing principle.
Figure 10A:
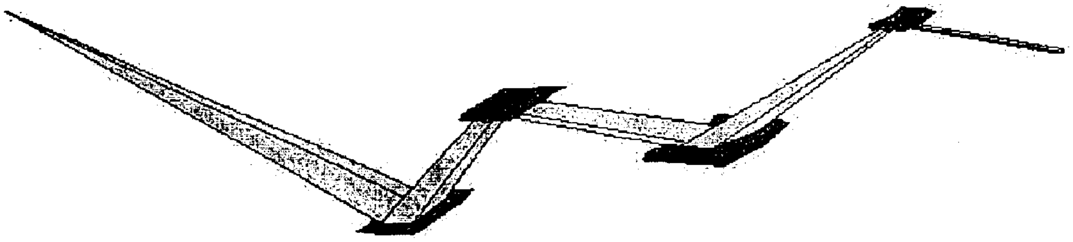
FIGS. 10*a* and 10*b* are views showing a point focusing principle.
Figure 10B:
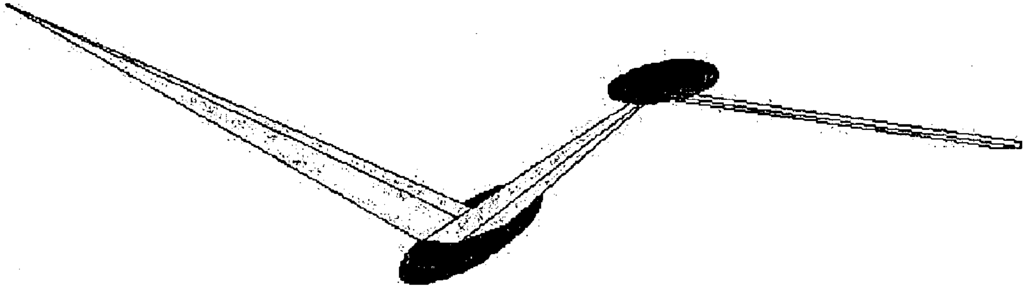

FIG. 9 shows a method of generating a parallel line beam, and FIGS. 10*a* and 10*b* show a method of generating a parallel point beam.

In the case of the method of generating a parallel point beam, third and fourth mirrors are arranged to have an angular difference of 90° with first and second mirrors, and a line beam generated by two times reflection is focused in a direction perpendicular to the line beam to form a point beam. Accordingly, when elliptical mirrors are used, four mirrors are required (refer to FIG. 10*a*).

In the case of neutron mirrors or X-ray mirrors, the flux of a beam is somewhat reduced whenever the beam is reflected, so it is required to reduce a loss of flux of light occurring at the time of reflection. In this invention, as illustrated in FIG. 10*b*, two elliptical mirrors are replaced with one ellipsoidal mirror, so four reflections can be reduced to two reflections. The X-ray mirror (Mo/Si, W/C, W/Si) and the neutron mirror ($^{58}$Ni, Ni/Ti) have multi-layer film structures in which layers of two materials are repeatedly laid one on top of another, and a loss of reflectance can occur due to its surface roughness and imperfection of a boundary surface. However, a reflectance of more than 90% can be achieved due to the recent development of a film coating technology.

A general ellipsoid equation is $$\frac{x^2}{a^2}+\frac{y^2}{b^2}+\frac{z^2}{c^2}=1.$$

When the amounts of divergence of a beam are the same in x-axis and z-axis directions, an ellipsoid equation is $$\frac{x^2}{a^2}+\frac{y^2}{b^2}+\frac{z^2}{a^2}=1,$$

a first ellipsoidal mirror having the same curvature in x-axis and z-axis directions can be manufactured, and a second ellipsoidal mirror can be designed and manufactured in the same manner as the first ellipsoidal mirror. When the amounts of divergence of a beam are different in x-axis and z-axis directions, a beam is focused by the first ellipsoidal mirror satisfying the general ellipsoid equation, and then a parallel beam can be formed by the dispersing action of the second ellipsoidal mirror. An equation for calculating ellipsoidal parameters of the second mirror can be obtained by expanding Equation 1 as below.

$$a' \approx \frac{S}{P}\times 2\times a \qquad (2)$$

$$b' \approx \frac{S}{P}\times 2\times b$$

$$c' \approx \frac{S}{P}\times 2\times c$$

FIGS. 11*a*, 11*b*, 12*a* and 12*b* are views showing arrangements of mirrors that are used to form line beams using neutron mirrors or super mirrors (F. Mezei, Comm. Phys. 1, 81 (1976), F. Mezei und P. Dagleish, Comm. Phys. 2, 41 (1977)).

Figure 11A:
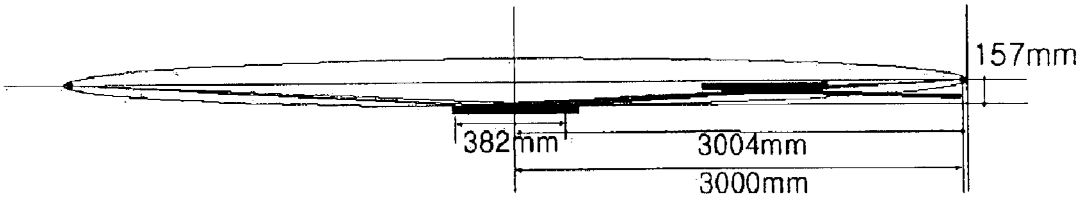
FIGS. 11*a* and 11*b* are views showing the arrangement of neutron mirrors.
Figure 11B:
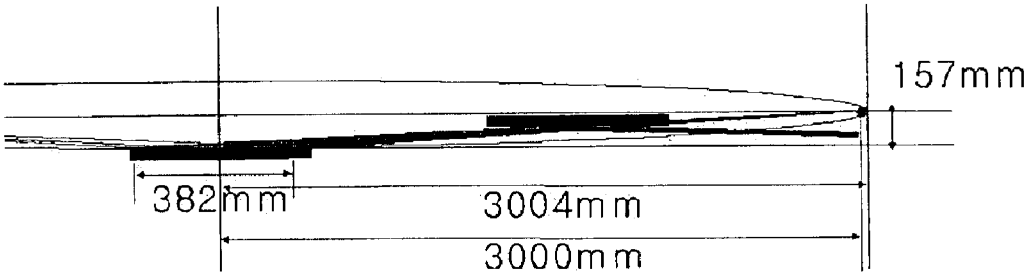

FIG. 11 shows an arrangement, in which the first mirror is arranged to be symmetric with respect to a y-axis of an ellipse, a distance from a neutron source to a rear end of a horizontal hole is 3000 mm, and a size of a neutron super mirror (Ni/Ti, 3M, 4.75 Å base, maximum complete reflection angle-about 3°) is 382 mm. FIG. 11*b* is an enlarged view of a portion on which the mirrors are arranged.

In this case, a large space is required to focus a beam reflected by a first mirror using a second mirror disposed on the opposite side, so the efficiency of use of a space can be improved by positioning the first mirror at a position near a right focal point.

Figure 12A:
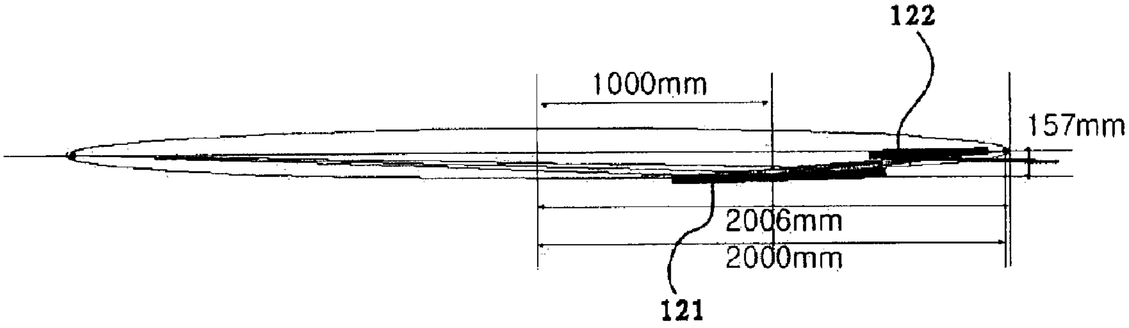
FIGS. 12*a* and 12*b* are exemplary views in which mirrors are differently arranged to improve the efficiency of use of a space.
Figure 12B:
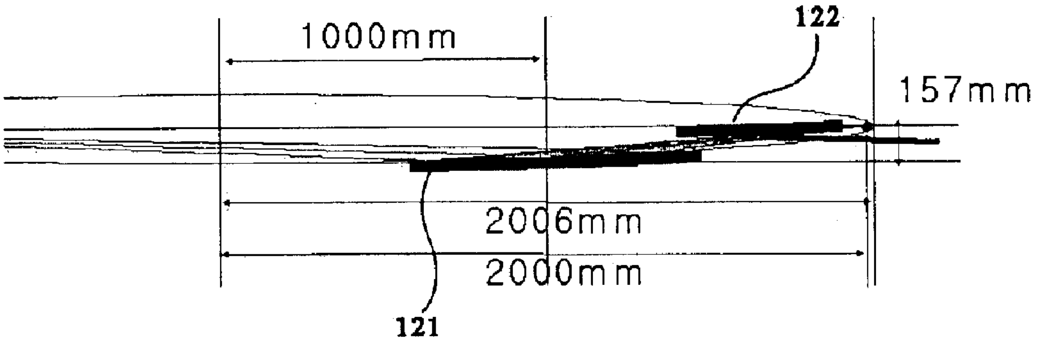

FIG. 12*a* is an example in which mirrors are differently arranged to improve the efficiency of use of a space. As described above, an interval between first and second mirrors is reduced by positioning the first mirror on a right side of an ellipse. A first neutron mirror 121 is positioned 1000 mm away from a short axis of an ellipse, a second neutron mirror 122 is positioned on an upper right portion of the ellipse, and a source is positioned at a left focal point of the ellipse. FIG. 12*b* is an enlarged view of a portion on which mirrors are positioned.

As described above, in this invention, the line focusing and point focusing of a beam are enabled through the geometrical arrangement of mirrors, so an increase in a flux of a light and the generation of a parallel beam are enabled.

In particular, a spectroscope using neutrons essentially requires the apparatus for generating a parallel beam in accordance with the present invention because it is not easy to approach a light source (a nuclear fission unit) and a neutron has a low flux compared to an X-ray.

Although a neutron is advantageous in the analysis of a material due to the particular characteristics thereof (magnetic moment and irregular scattering length density), compared to an X-ray, the neutron is disadvantageous in that an excessive measuring time is required due to the low flux thereof, compared to an X-ray. However, the flux of a neutron can be increased using the arrangement of mirrors according to the present invention, so more users can be induced to use neutron spectroscopes.

The scheme of the present invention may be used in diffraction, reflectometry, high resolution diffraction and proteins weakly scattered in a single crystal. When used in conjunction with a prior art capillary tube technology, the scheme of the present invention is further effective.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for generating a parallel beam with a high flux through an elliptical arrangement of mirrors, comprising:

a light source positioned at a first focal point of a first ellipse;

a first mirror positioned on the first ellipse to reflect a beam emitted by the light source, and concavely shaped to conform to a section of the first ellipse; and a second mirror positioned across a path of the beam reflected by the first mirror, and convexly shaped to conform to a section of a second ellipse so that an angle formed by two tangent lines passing through each pair of incident points of neighboring rays incident upon the second mirror, respectively, is half of an angle formed by two tangent lines passing through each pair of incident points of neighboring rays incident upon the first mirror, respectively.

2. The apparatus as set forth in claim 1, wherein the first mirror is positioned at an end of a short axis of the first ellipse.

3. The apparatus as set forth in claim 1, wherein the first mirror is positioned between an end of a long axis of the first ellipse and an end of a short axis, of the first ellipse in the vicinity of a second focal point of the first ellipse.

4. The apparatus as set forth in any of claims 1 to 3, wherein elliptical parameters a' (a half of a distance of the long axis), b' (a half of a distance of the short axis) and e' (a distance between a center and a focal point) of the second ellipse are obtained by the following equations $$a' \approx \frac{S}{P} \times 2 \times a$$

$$b' \approx \frac{S}{P} \times 2 \times b$$

$$e' \approx \sqrt{a'^2 + b'^2}$$

where a and b are elliptical parameters of the first ellipse, P is a maximum distance between the incident points of the first mirror, and a maximum distance between the incident points of the second mirror.

* * * * *